United States Patent [19]
Luken et al.

[11] Patent Number: 6,057,851
[45] Date of Patent: May 2, 2000

[54] COMPUTER GRAPHICS SYSTEM HAVING EFFICIENT TEXTURE MAPPING WITH PERSPECTIVE CORRECTION

[75] Inventors: William Louis Luken, Yorktown Heights; Chandrasekhar Narayanaswami, Valhalla, both of N.Y.

[73] Assignee: International Business Machines Corp., Armonk, N.Y.

[21] Appl. No.: 09/054,021

[22] Filed: Apr. 2, 1998

Related U.S. Application Data

[63] Continuation-in-part of application No. 08/586,266, Jan. 16, 1996
[60] Provisional application No. 60/005,064, Oct. 6, 1995.
[51] Int. Cl.[7] .................................................. G06T 17/00
[52] U.S. Cl. ............................................................. 345/430
[58] Field of Search ...................................... 345/430, 419, 345/418, 423, 439

[56] References Cited

U.S. PATENT DOCUMENTS

| | | | |
|---|---|---|---|
| 5,394,516 | 2/1995 | Winser | 345/419 |
| 5,870,097 | 2/1999 | Snyder et al. | 345/426 |
| 5,886,701 | 3/1999 | Chauvin et al. | 345/418 |
| 5,886,703 | 3/1999 | Mauldin | 345/423 |
| 5,977,977 | 11/1999 | Kajiya et al. | 345/418 |

FOREIGN PATENT DOCUMENTS 0 637 813 A2  2/1995  European Pat. Off. .

OTHER PUBLICATIONS

"Survey of Texture Mapping", P.S. Heckbert, IEEE CG&A, 1986.

"Interpolation for Polygon Texture Mapping and Shading", P.S. Heckbert and H.P. Moreton, Dept. of Electrical Eng. and Computer Sciences, Univ. of Calif., Berkeley, CA 94720, Jul. 15, 1990.

"A Trip Down the Graphics Pipeline: The Homogeneous Perspective Transform", J.F. Blinn, IEEE Computer Graphics & Applications, May 1993.

*Primary Examiner*—Mark R. Powell
*Assistant Examiner*—Huedung X. Cao
*Attorney, Agent, or Firm*—Jay P. Sbrollini

[57] ABSTRACT

A computer graphics system stores graphics data the represents one or more three dimensional objects. The objects are represented by one or more primitives each defined by a plurality of vertices. The graphics systems renders the objects to generate a two dimensional image for display. During the rendering operation, coordinates of vertices of said primitives are subjected to a perspective transformation. The present invention provides a method and apparatus that uses at least one look-up table for mapping a texture function to pixels covered by at least one of said primitives.

26 Claims, 8 Drawing Sheets

COMPUTER GRAPHICS SYSTEM HAVING EFFICIENT TEXTURE MAPPING WITH PERSPECTIVE CORRECTION

CROSS-REFERENCE TO RELATED APPLICATIONS

The present application claims priority to co-pending U.S. Provisional Application Ser. No. 60/005,064 filed Oct. 6, 1995. This application is also a continuation of U.S. application Ser. No. 08/586,266, filed Jan. 16, 1996, herein incorporated by reference in its entirety.

BACKGROUND OF THE INVENTION

1. Technical Field

The present invention relates to the perspective projection that is part of the texture mapping function performed at each pixel by a computer graphics system.

2. Description of the Prior Art

Computer graphics systems are frequently used to model a scene having three-dimensional objects and display the scene on a two-dimensional display device such as a cathode ray tube or liquid crystal display. Typically, the three-dimensional objects of the scene are each represented by a multitude of polygons (or primitives) that approximate the shape of the object.

Texture mapping is the mapping of a function onto a three-dimensional surface. The domain of the function may be one, two, or three dimensional. Moreover, the function may be represented by an array or a mathematical function. Some of the parameters that may be texture mapped include:

1) surface color;
2) specular reflection;
3) normal vector perturbation ("bump mapping");
4) specularity (the glossiness coefficient);
5) transparency;
6) diffuse reflection; and
7) shadows, surface displacement, and mixing coefficients.

Generally, to perform the texture mapping operation, a source image (texture) is mapped onto a surface of a three-dimensional object in object space, which is then mapped to the viewing coordinate system by the viewing projection. Correct treatment of perspective projections while performing texture mapping requires a divide operation at each pixel. A more detailed description of the perspective projection required for texture mapping may be found in P.S. Heckbert, "Survey of Texture Mapping", IEEE Computer Graphics and Applications, November 1986, pp. 56–67, and P.S. Heckbert et al. "Interpolation of Polygon Texture Mapping and Shading", TM 13, NYIT Computer Graphics Lab, April 1983, hereinafter incorporated by reference in their entirety. Conventionally, the divide operation required to perform the perspective projection is accomplished by an exact divide operation, which is very computationally intensive requiring extensive processing time and/or hardware.

EP 0637813A2 discloses a method and apparatus that utilizes a plurality of look-up tables to perform the texture mapping function with perspective projection. More specifically, for each triangular polygon to be rendered, the (x,y) view coordinates, the original z-coordinate, and the corresponding (u,v) texture coordinates of the vertices of the triangular polygon are supplied to a processor 41. The processor 41 determines the pixel positions (x,y) between two vertices and forwards the z-coordinate value of the two vertices to a selector. The selector selects a particular look-up table from a plurality of look-up tables stored in a memory device according to the supplied z-coordinate values. Each look-up table stores a function that represents an interpolated value of the change in the u (or v) texture coordinate as a function of a given pixel position (x,y) and a given z-coordinate. Then, for each pixel, the processor 41 addresses the selected lookup table to provide for a substantially perspective correct mapping of the texture coordinate at the pixel. This method too is inefficient requiring the processing time and circuity to select the appropriate lookup table, and also requires a memory device to hold the plurality of look-up tables.

Another alternative is to subdivide the primitives very finely so that perspective errors become less perceptible. However, this approach has the drawback of increasing the number of primitives to be processed by the raster subsystem, thus increasing the work performed by the raster subsystem.

As a consequence, texture mapping is performed without perspective correction in most lower cost systems. Thus, there is a need for a method and apparatus that provides for texture mapping with perspective correction that is suitable for use in lower cost systems, and that also provides for improved performance of the texture mapping function.

SUMMARY OF THE INVENTION

The above-stated problems and related problems of the prior art are solved with the principles of the present invention, computer graphics system having efficient texture mapping with perspective correction. A computer graphics system stores graphics data the represents one or more three dimensional objects. The objects are represented by one or more primitives each defined by a plurality of vertices. The graphics systems renders the objects to generate a two dimensional image for display. During the rendering operation, coordinates of vertices of said primitives are subjected to a perspective transformation which yields a perspectively transformed depth coordinate associated with the vertex. The present invention provides a method and apparatus for mapping a texture function to pixels covered by at least one of said primitives.

The method and corresponding apparatus of the present invention associates at least one texture parameter to each vertex of the primitives. For each vertex of the primitives, a perspective factor associated with the given vertex is determined based upon the perspectively transformed depth coordinate associated with the given vertex. The perspective factor associated with the given vertex is applied to each texture parameter associated with the given vertex to generate a perspectively transformed texture parameter associated with the given vertex.

Then, for each pixel covered by the primitive, the following operations are performed. First, for each texture parameter associated with each vertex of the primitive, a perspectively transformed texture parameter associated with the given pixel is determined according to the perspectively transformed texture parameters associated with each vertex of the primitives. Second, a perspective factor associated with the given pixel is determined according to the perspective factor associated with each vertex of the primitive. Third, an approximation of M over said perspective factor associated with the given pixel is determined according to data stored in a look up table. Finally, for each perspectively transformed texture parameter associated with the given pixel, an operation is performed on the perspectively transformed texture parameter, the perspective factor and the approximation associated with the given pixel to determine a perspectively correct value of said texture parameter associated with the given pixel.

In performing these operations, the present invention provides for texture mapping with perspective correction. Advantageously, the texture mapping mechanism of the present invention may be implemented with a small look up table and modest circuitry, and thus is suitable for use in lower cost systems.

DETAILED DESCRIPTION OF THE PREFERRED EMBODIMENTS

Figure 1:
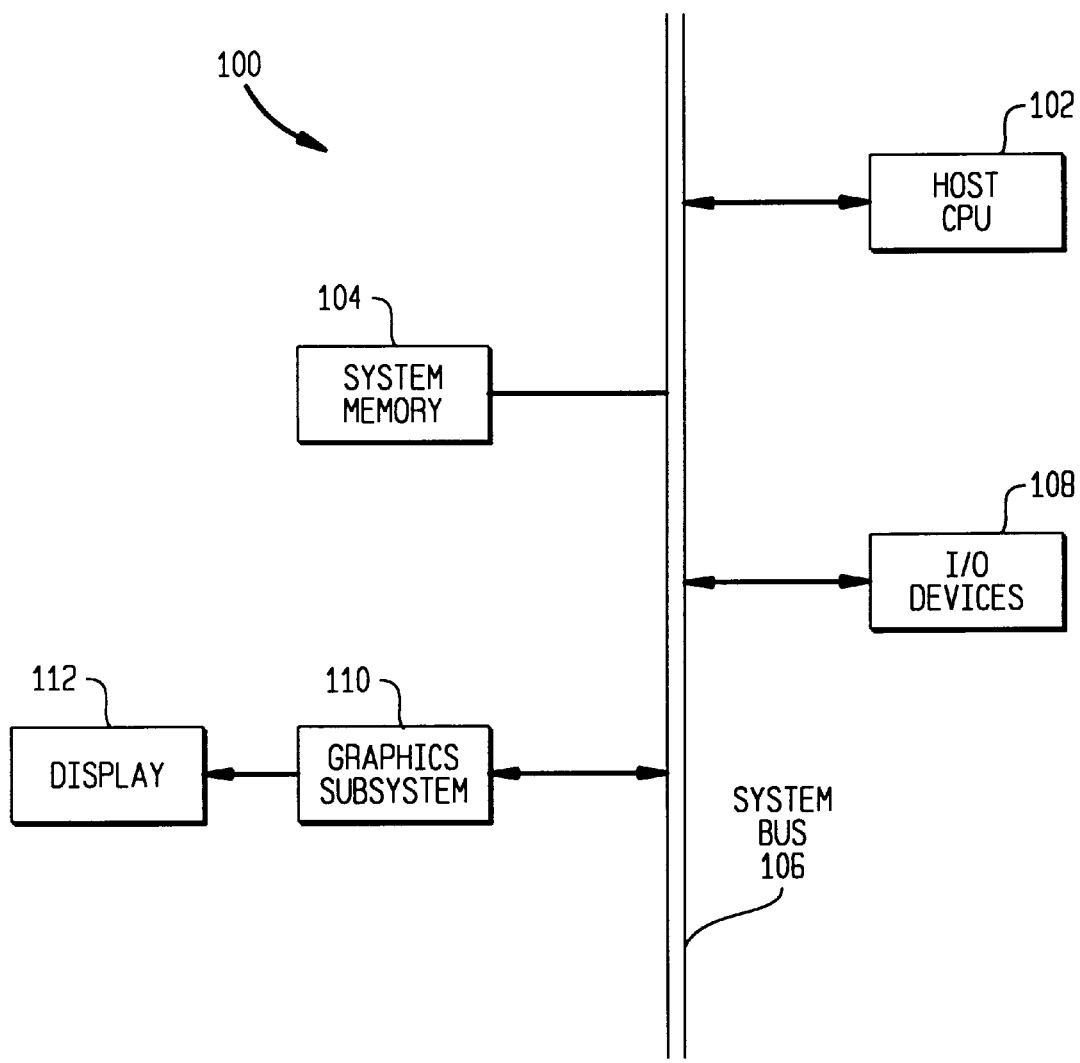
FIG. 1 is a functional block diagram of a computer graphics system.

As shown in FIG. 1, a conventional graphics system 100 includes a host processor 102 which is coupled to a system memory 104 via a system bus 106. The system memory 104 consists of random access memory (RAM) that stores graphics data defining the objects contained in one or more three dimensional models. The graphics data that defines each object consists of coordinates and attributes (e.g. color, reflectance, texture) of primitives. The primitives are geometric entities such as a polygon, line or surface. Typically, the primitives are triangles defined by the coordinates of three vertices. In this case, the system memory 104 includes an ordered list of vertices of the triangles that define the surfaces of objects that make up a three dimensional scene. In addition, the system memory 104 may store a list of triangle identifiers that correspond to each of the triangles and transformation matrices that specify how the triangles are situated and oriented in the scene. Input/output (I/O) devices 108 interface to the host processor 102 via the system bus 106. The I/O devices may include a keyboard, template or touch pad for text entry, a pointing device such as a mouse, trackball, Spaceball or light pen for user input, and non-volatile storage such as a hard disk or CD-ROM for storing the graphics data and any application software. As is conventional, the graphics data and application software is loaded from the non-volatile storage to the system memory 104 for access by the system processor 102.

The graphics system 100 also includes a graphics subsystem 110 that interfaces to the system memory 104 via the system bus 106. Generally, the graphics subsystem 110 operates to render the graphics data stored in the system memory 104 for display on a display area of a display device 112 according to graphics orders transferred from the host processor 102 to the graphics subsystem 110. The graphics orders typically are generated by application software that are stored in the system memory 104 and executed by the system processor 102. The graphics orders typically consist of a sequence of data blocks that include, or point to, the graphics data (e.g. coordinates and attributes of one or more objects) that defines the objects of the scene, associated transformation matrices, and any other necessary information required by the graphics subsystem 110. The primitives associated with the graphics orders are typically defined by the value of the geometric coordinates (x0, y0, z0) or homogeneous coordinates (xm, ym, zm, wm) for each vertex of the primitive, wherein x0=xm/wm, y0=ym/wm, and z0=zm/wm. If omitted, default values of wm=1 and zm=0, for example, may be assumed. In addition, graphics orders typically include, or point to, data defining the reflectance normal vectors (nx, ny, nz) for the vertices of each primitive. The values of these coordinates and normal vectors are assumed to be specified in a coordinate system designated as the model coordinate system.

Although the graphics subsystem 110 is illustrated as part of a graphics work station, the scope of the present invention is not limited thereto. Moreover, the graphics subsystem 110 of the present invention as described below may be implemented in hardware such as a gate array or a chip set that includes at least one programmable sequencer, memory, at least one integer processing unit and at least one floating point processing unit, if needed. In addition, the graphics subsystem 110 may include a parallel and/or pipelined architecture as shown in U.S. Pat. No. 4,876,644, commonly assigned to the assignee of the present invention and incorporated by reference herein in its entirety. In the alternative, portions of the graphics subsystem 110 may be implemented in software together with a processor. The processor may be a conventional general purpose processor, a part of the host processor 128, or part of a co-processor integrated with the host processor 128.

More specifically, the graphics subsystem 110 includes a control unit 200 that supervises the operation of the graphics subsystem 110. Upon receiving a graphics order to render a scene, the control unit 200 passes the graphics data associated with the graphics order on to a rendering pipeline. The rendering pipeline transforms the graphics data associated with the graphics order from the model coordinate system to a normalized device coordinate system designated the view coordinate system and clips the graphics data against a predetermined view volume. In addition, depending upon the shading algorithm to be applied, an illumination model is evaluated at various locations (ie. the vertices of the primitives and/or the pixels covered by a given primitive). The transformed and clipped graphics data is then passed on to a rasterization stage that converts the transformed primitives into pixels, and generally stores each primitive's contribution at each pixel. The rendering pipeline may be organized in a variety of architectures. A more detailed discussion of such architectures may be found in Foley et. al., "Computer Graphics: Principles and Practice", pp. 855–920 (2nd Ed. 1990), herein incorporated by reference in its entirety. The present invention provides a texture mapping mechanism with perspective correction that may be integrated into any rendering pipeline. For the sake of description, an example of a common rendering pipeline is set forth below.

Figure 2:
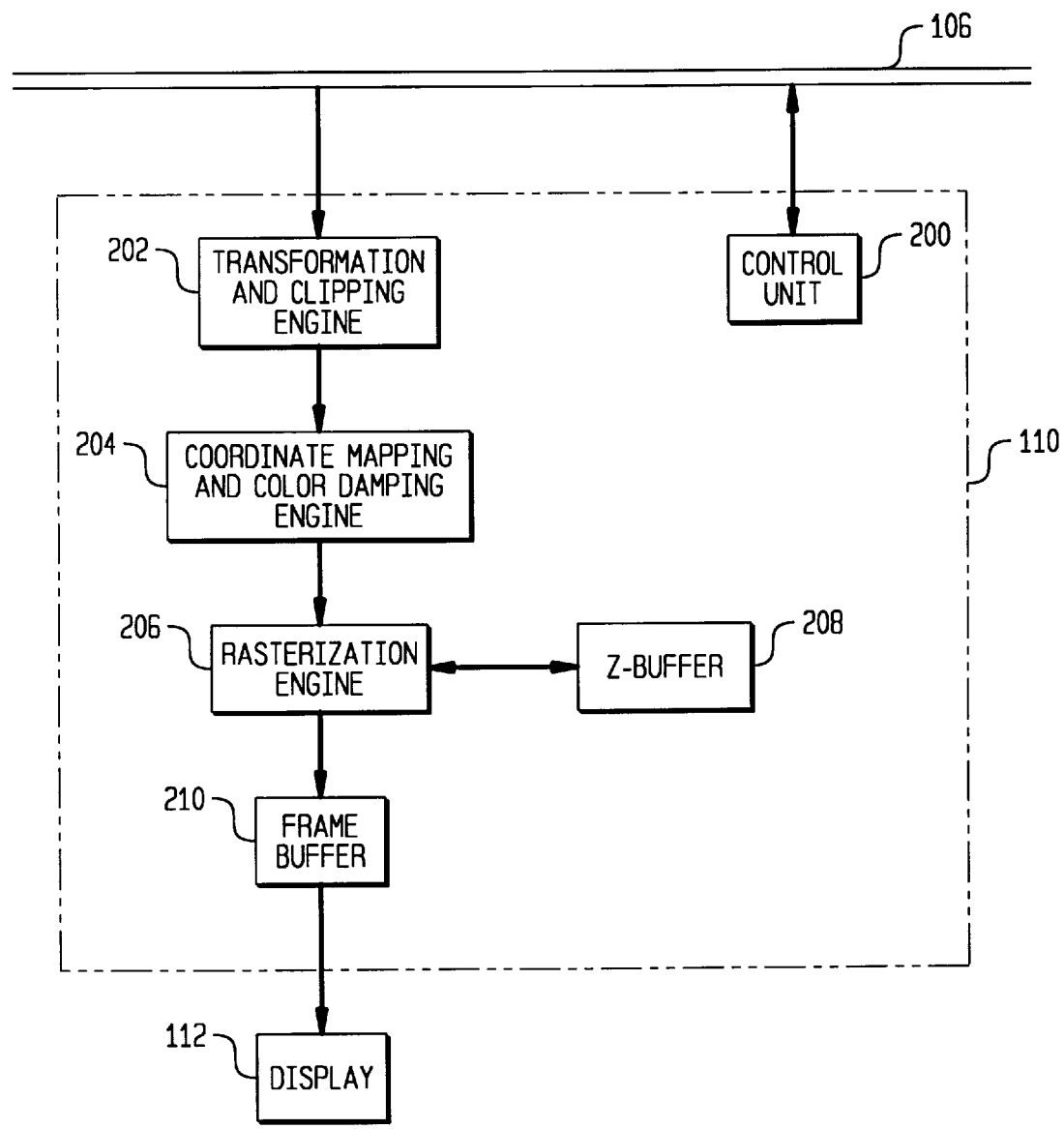
FIG. 2 is a functional block diagram of the graphics subsystem of the computer graphics system of FIG. 1.

More specifically, as shown in FIG. 2, a common rendering pipeline includes a transformation and clipping engine 202, a coordinate mapping and color clamping engine 204, a rasterization engine 206, Z-buffer 208, and at least one frame buffer 210. Z-buffer 208 typically contains sufficient memory to store a depth value for each pixel of the display 112. Conventionally, the depth value is stored as a 24-bit integer for each pixel. Frame buffer 210 typically contains sufficient memory to store color data for each pixel of the display 112. Conventionally, the color data consists of three 8-bit integers representing red, green and blue (r,g,b) color values for each pixel.

Figure 3:
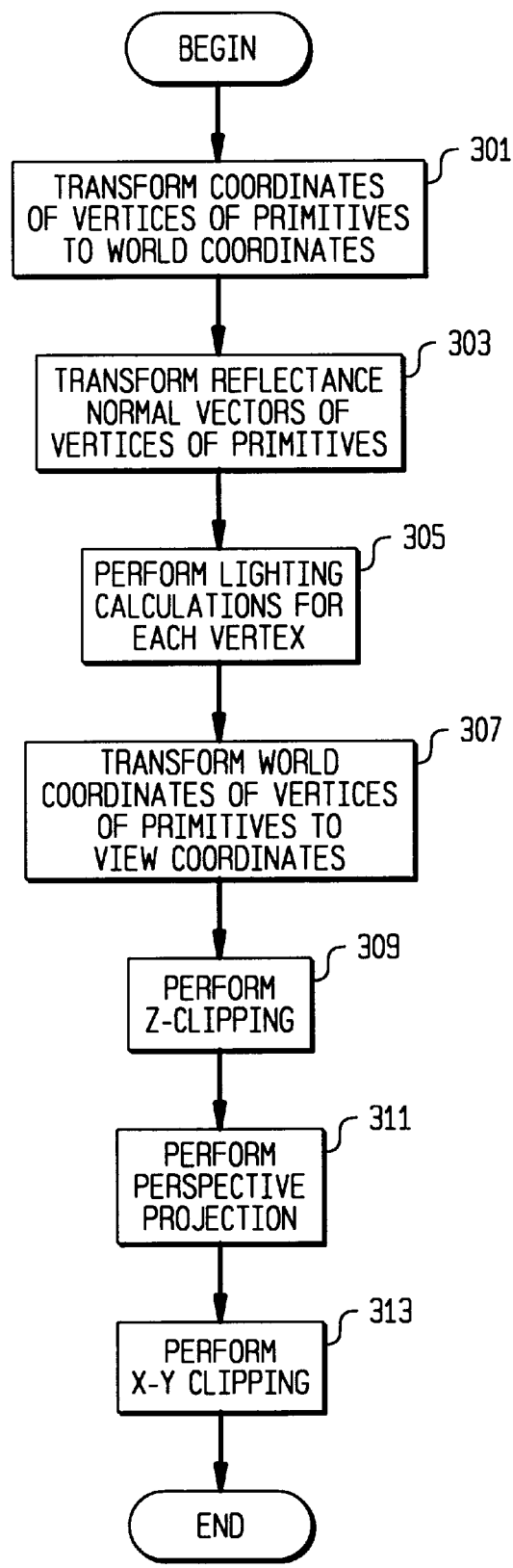
FIGS. 3(A)–(B) are flow charts illustrating operation of the transformation and clipping engine of the graphics subsystem of FIG. 2.

The transformation and clipping engine 202 transforms the graphics data associated with the graphics order from the model coordinate system to a normalized device coordinate system designated the view coordinate system. More specifically, as shown in FIG. 3, the operation of the transformation and clipping engine 202 begins in step 301 by subjecting the homogenous geometric coordinates (xm, ym, zm, wm) of each vertex of the primitives to be rendered to the following 4×4 transformation matrix t:

$$xw=t11*xm+t12*ym+t13*zm+t14*wm$$

$$yw=t21*xm+t22*ym+t23*zm+t24*wm$$

$$zw=t31*xm+t32*ym+t33*zm+t34*wm$$

$$ww=t41*xm+t42*ym+t43*zm+t44*wm$$

The values of the matrix t elements t11, t12 . . . t44 are determined by reference to other graphics orders supplied to the rendering pipeline. Multiplication by the matrix t has the effect of converting the data values (xm, ym, zm, wm) in modeling coordinates into the values (xw, yw, zw, ww) in a coordinate system designated as world coordinates.

In step 303, the reflectance normal vectors (nx, ny, nz) of each vertex of the primitives to be rendered are subject to the following 3×3 transformation matrix s, $$nxw=s11*nx+s12*ny+s13*nz$$

$$nyw=s21*nx+s22*ny+s23*nz$$

$$nzw=s33*nx+s32*ny+s33*nz$$

The values of the matrix s elements s11, s12 . . . s44 are determined by the inverse transpose of the upper left 3×3 elements (t11,t12,t13,t21,t22,t23,t31,t32,t33) of the matrix t. This ensures that the vectors represented by (nxw, nyw, nzw) remain perpendicular to the surfaces represented by the transformed coordinates (xw, yw, zw, ww). In step 303, the resulting normal vectors are then converted into unit vectors by dividing by the norm of (nxw, nyw, nzw) as follows:

$$norm=sqrt(nxw*nxw+nyw*nyw+nzw*nzw)$$

$$nxu=nxw/norm$$

$$nyu=nyw/norm$$

$$nzu=nzw/norm$$

In step 305, the transformed coordinates (xw, yw, zw, ww) and the normal unit vectors (nxu,nyu,nzu) for each vertex are used to evaluate the lighting equations for each vertex.

Examples of such lighting equations may be found in Foley et. al., "Computer Graphics: Principles and Practice", pp. 721–734 (2nd Ed. 1990), herein incorporated by reference in its entirety. The lighting calculations typically also depend upon surface material properties and light source definitions defined by one or more other graphics orders. The result of lighting calculations is a color (r, g, b) for each vertex of the primitives to be rendered.

In step 307, the world coordinates (xw,yw,zw,ww) of each vertex to be rendered is then subjected to a 4×4 view transformation matrix v as follows:

$$xv=v11*xw+v12*yw+v13*zw+v14*ww$$

$$yv=v21*xw+v22*yw+v23*zw+v24*ww$$

$$zv=v31*xw+v32*yw+v33*zw+v34*ww$$

$$wv=v41*xw+v42*yw+v43*zw+v44*ww$$

The values of the matrix v elements v11, v12 . . . v44 are determined by the position and orientation of the camera or viewer in the world coordinates. This transformation has the effect of converting the world coordinates (xw, yw, zw, ww) into the view coordinate system, wherein the z axis corresponds to the direction of view, and the x axis is the horizontal axis perpendicular to the direction of view. The origin of the view coordinate system is located in the center of the screen or window, and the w axis is parallel to the z axis with its origin at the eye point. Preferably, the w axis corresponds to the z axis.

In step 309, the transformation and clipping engine 202 clips each primitive against a (Zmin, Zmax) pair. Preferably, the (Zmin, Zmax) pair is chosen according to the scale of the model and the size of the Z-buffer. More specifically, if the zv coordinate of each of the vertices of a primitive lies inside the (Zmin, Zmax) interval, the primitive is identified as trivially accepted. If the zv coordinate of each of the vertices of a primitive lies outside the (Zmin, Zmax) interval, the primitive is identified as trivially rejected. However, if the zv coordinate of some, but not all, of the vertices of a primitive lies inside the {Zmin,Zmax} interval, the transformation and clipping engine 202 preferably determines the points where the primitive crosses the boundaries of the (Zmin,Zmax) interval. The result is at least one modified primitive determined by the intersection of the original primitive to the boundaries of the (Zmin,Zmax) interval. Other attributes, such as vertex colors determined by the lighting conditions must be interpolated to the crossing points for the modified primitive. Moreover, if the resulting modified primitive corresponds to a null extent, the original primitive is preferably identified as being trivially rejected.

In step 311, the transformation and clipping engine 202 performs a perspective projection on each primitive identified in step 309 as trivially accepted and on those modified primitives generated in step 309. The perspective projection may be accomplished by dividing xv, yv, and zv of each vertex of the given primitive by wv as follows:

$$xp=xv/wv$$

$$yp=yv/wv$$

$$zp=zv/wv$$

$$wp=1/wv$$

In the alternative, when the w-axis corresponds to the z-axis, the perspective projection for each vertex may be accomplished as follows:

$xp=xv/zv$ $yp=yv/zv$ $zp=1/zv$

In step 313, the resulting projected coordinates (xp,yp,zp) and color value (r,g,b) of each vertex for those primitives identified in step 309 as trivially accepted and for those modified primitives generated in step 309 are clipped against a predetermined clipping area defined by the coordinate pairs (Xmax,Ymax) and (Xmin,Ymin) to thereby identify the portions of the transformed primitives that are potentially visible. Preferably, the Xmax,Xmin values are chosen according to the field of view parameters of the system and the Ymax,Ymin values are chosen according to the depth of field parameters of the system. More specifically, if the coordinates (xp, yp) of each vertex of a given primitive are within the clipping area, then the primitive is identified as being trivially accepted. If the coordinates (xp,yp) of each vertex of the given primitive fall outside the clipping area, then the primitive is identified as being trivially rejected. However, if the coordinates (xp,yp) of only some of the vertices of a given primitive lie inside the clipping area, the transformation and clipping engine 202 preferably determines the points where the given primitive crosses the boundaries of the clipping area. Other attributes, such as vertex colors determined by the lighting conditions must be interpolated to the crossing points. The result is at least one modified primitive determined by the intersection of the original primitive to the boundaries of the clipping area. Moreover, if the resulting modified primitive corresponds to a null extent, then preferably the original primitive is identified as being trivially rejected. Examples of the algorithms used by the transformation and clipping engine 202 may be found in Foley et. al., "Computer Graphics: Principles and Practice", pp. 229–281, 866–870 (2nd Ed. 1990), herein incorporated by reference in its entirety. The modified primitives and color values resulting from such clipping as well as the trivially accepted primitives are supplied to the coordinate mapping and color clamping engine 204.

Figure 4:
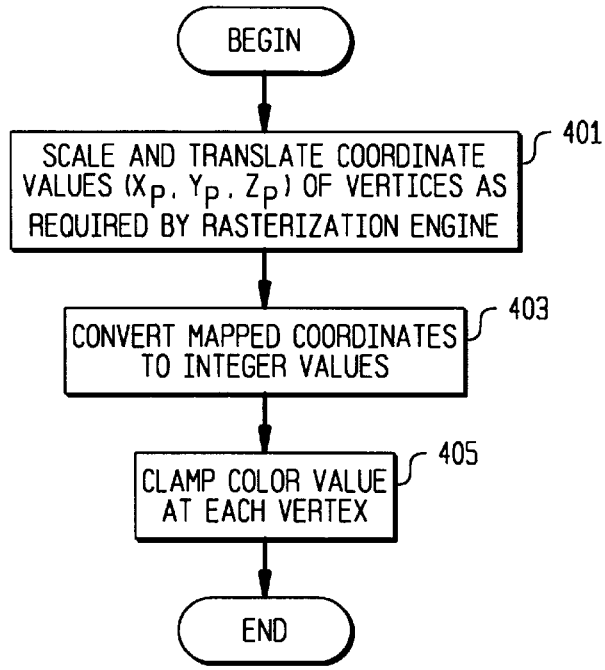
FIG. 4 is a flow chart illustrating operation of the coordinate mapping and color clamping engine of the graphics subsystem of FIG. 2.

As shown in FIG. 4, in step 401, the coordinate mapping and color clamping engine 206 scales and translates the coordinate values (xp,yp,zp) of each vertex such that the values correspond to values required by the rasterization engine 206, according to the following equations:

$xmap=mx1*xp+mx2$ $ymap=my1*yp+my2$ $zmap=mz1*zp+mz2$

The scaling factors mx1,my1,mz1 and the translational factors mx2,my2,mz2 are determined from the size and resolution of the display area of the display device 112. In step 403, the resulting mapped coordinates (xmap,ymap, zmap) of each vertex are converted from floating point representations to integer values.

In step 405, the coordinate mapping and color clamping engine 206 performs a color clamping operation for each vertex by limiting each component (r,g,b) of the color value of the vertex to some maximum value, for example +1. The resulting clamped color values (r,g,b) of each vertex are then scaled to a predetermined range and converted from floating point form to integer values (nr,ng,nb) in a predetermined range, for example 0 to 255. The resulting mapped coordinates (xmap,ymap,zmap) of the vertices and the clapped integer color values are supplied to the rasterization engine 206.

Figure 5:
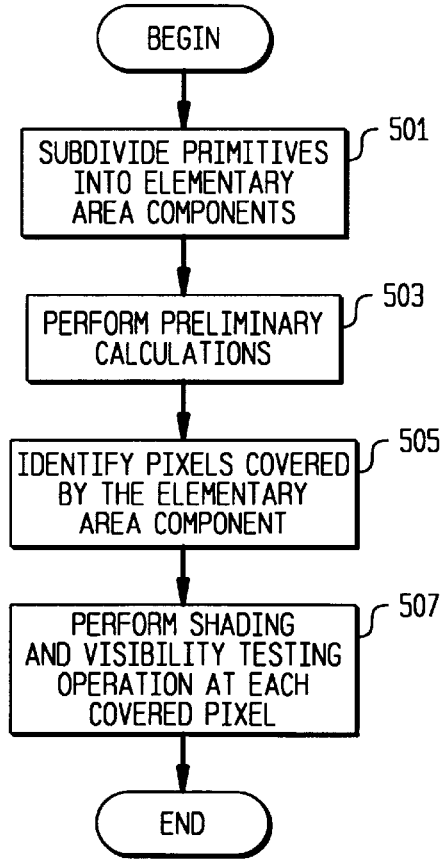
FIG. 5 is a flow chart illustrating operation of the rasterization engine of the graphics subsystem of FIG. 2.

The rasterization engine 206 decomposes the primitives identified by the vertices supplied by the coordinate mapping and color clamping engine 204 to calculate and store in the frame buffer 210 the integer color values of the visible pixels which are covered by each primitive. More specifically, as shown in FIG. 5, if the primitives (identified by the vertices supplied by the coordinate mapping and color clamping engine 204) do not correspond to elementary area components such as a triangle or trapezoid, the rasterization engine 206 in step 501 subdivides the primitives (identified by the vertices supplied by the coordinate mapping and color clamping engine 204) into such elementary area components and operation continues to steps 503–507 for each of the elementary components. The subdividing operation, for example, may be a triangulation operation that decomposes each of the primitives into a mesh of triangles whose vertices are shared. However, if the primitives (identified by the vertices supplied by the coordinate mapping and color clamping engine 204) correspond to elementary area components, the rasterization engine 206 performs the steps 503–507 for each of the primitives/area components. In this case, the subdividing operation may have been accomplished as part of a pre-processing stage, thus providing primitives that correspond to such elementary area components.

In step 503, the given elementary area component is subjected to a set of preliminary calculations. These preliminary calculations typically involve sorting vertices of the components with respect to x or y coordinate of the components, classifying the shape (e.g. as having clockwise or counterclockwise vertex ordering), and evaluating partial derivatives of color values (nr, ng, nb) and depth values (z) with respect to x and y (in other words, evaluating the plane equations). The resulting partial derivatives may be designated by $\partial nr/\partial x$, $\partial nr/\partial y$, $\partial ng/\partial x$, $\partial ng/\partial y$, $\partial nb/\partial x$, $\partial nb/\partial y$ based upon the given (nr,ng,nb) color values and (x,y) coordinates at the vertices of the area components. If the plane equations indicates that a given area component has zero area (because of coincident or collinear vertex coordinates), preferably the operation of the rasterization engine 206 with respect that the given area component is ended; otherwise, the operation continues to step 505–507 for the given area component.

In step 505, the rasterization engine 206 identifies the pixels that cover the interior of the area component. This process is based on the values determined by sorting and classification of the area component. Each of the resulting pixels is defined by an x value corresponding to a column (horizontal position) of the graphics display, and a y value corresponding to a row (vertical position) of the graphics display. Each pair of x and y values corresponds to a unique address in the frame buffer. Each pair of x and y values also corresponds to a unique address in a second block of memory called the z-buffer. The logic used to generate a sequence of pixel values (x and y pairs) typically divides an area component into a sequence of rows (y values). Each row is then divided into a sequence of pixels (x values).

In step 507, shading calculations and visibility testing is performed for each pixel identified in step 505. The shading calculations generate the color values (r,g,b) associated with the area component at the pixel. The shading calculations may be one of many known to those skilled in the art, for example flat shading or Phong shading. Another common shading technique is Gouraud shading, which is described in more detail in U.S. patent application Ser. No. 08/408,513 in the name of J. A. Gerth et al., hereinafter incorporated by reference in its entirety. As is conventional, the visibility testing is performed by comparing the z value of the area component at the pixel, the Znew value, with the value of Zold for the given pixel. The Zold value is determined by loading the contents of the z-buffer 208 located at the address defined by the values of x and y for the given pixel. If the value of Znew passes the z-buffer comparison test, then the value of Znew is stored in the z-buffer 208 at the address determined by the values of x and y, thereby replacing the value of Zold used in the z-buffer comparison test, and the color values (r,g,b) determined by the shading calculations for the given pixel are stored in the frame buffer 210 at addresses determined by the values of x and y. However, if the value of Znew fails the z-buffer comparison test, then the z-buffer 208 and frame buffer 210 are not updated and processing continues to the next pixel.

The operation of updating the frame buffer 210 in step 507 may include a wide variety of functions beyond simply replacing the current contents of a specific address with new color values. For example, this may involve adding the new color values to the previous contents, replacing the current contents with a linear combination of the new and old value (known as alpha blending), or replacing the current contents with the result of logical operations (e.g., and, or, xor) involving the current contents of the frame buffer and the new values. These operations may also be subject to masking operations which inhibit changes to various pixels or sets of bits within each pixel. Likewise, the operation of updating the z-buffer 208 may also be subject to any number of further qualifications, as recognized by one skilled in the art, including masks which prevent some or all elements of the z-buffer 208 from being modified.

Preferably, the rasterization of the area components is divided into a test mode and a normal mode as described in detail in U.S. patent application Ser. No. 08/408,513 in the name of J. A. Gerth et al., incorporated by reference above in its entirety. However, the present invention is not limited in this respect and may be integrated as part of any rasterization scheme. Moreover, examples of the visibility testing and shading algorithms used by the rasterization engine 208 may be found in Foley et. al., "Computer Graphics: Principles and Practice", pp. 649–717, 734–814, 870–871 (2nd Ed. 1990), herein incorporated by reference in its entirety.

As is conventional, the frame buffer 210 stores pixel data that represents the color of each pixel of the display device. The pixel data is periodically output from the frame buffer 210 for display on the display device 112. In addition, the graphics subsystem 110 may include more than one frame buffer. As is conventional, one of the frame buffers serves as the active display portion, while another one of the frame buffers may be updated for subsequent display. Any one of the frame buffers may change from being active to inactive in accordance with the needs of the system; the particular manner in which the changeover is accomplished is not relevant to the present invention.

Figure 6:
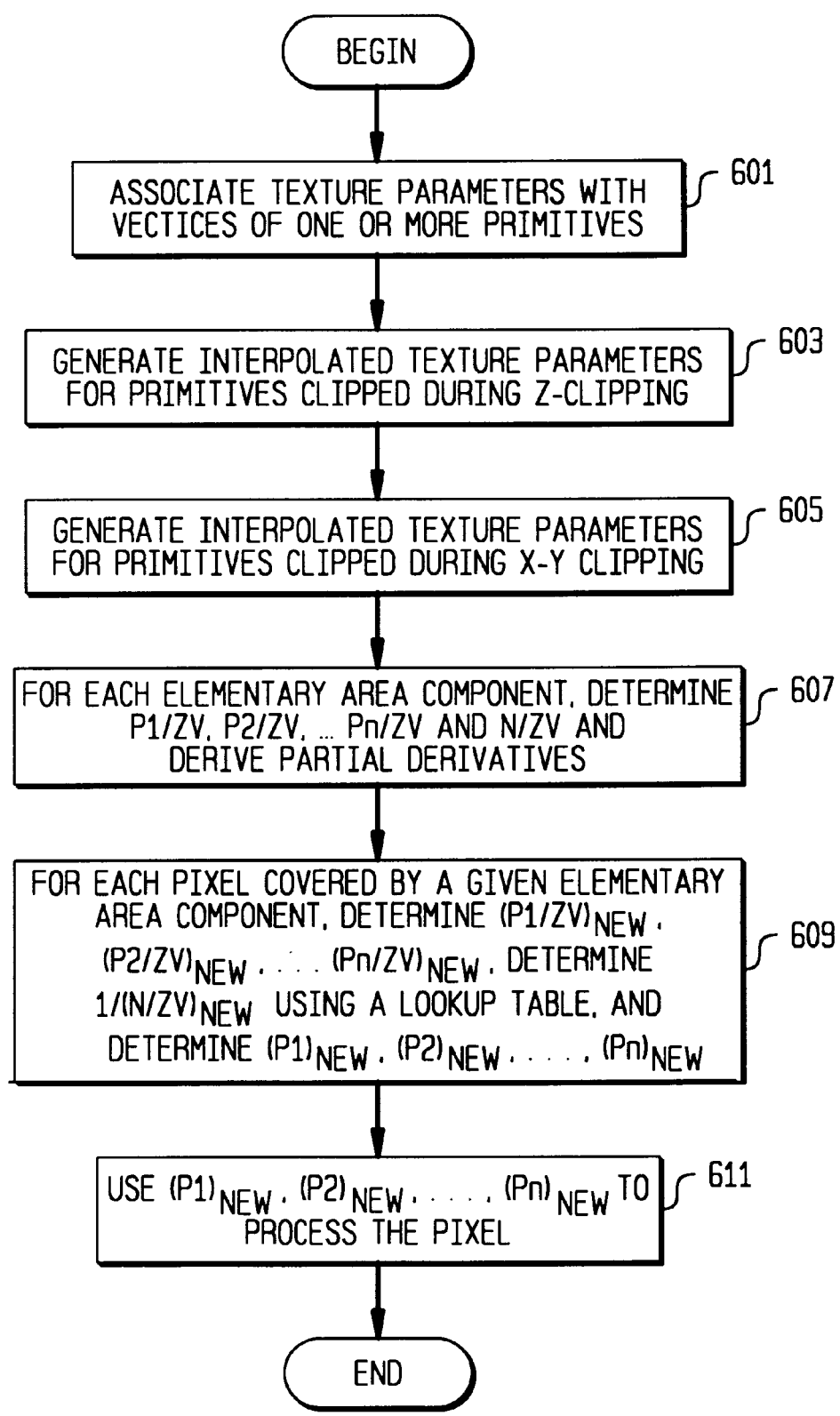
FIG. 6 is a flow chart illustrating operation of the texture mapping mechanism of the present invention.

According to the present invention, an efficient texture mapping mechanism is provided that may be integrated into the rendering pipeline of FIG. 2, or may be integrated into other rendering architectures. Generally, the texture mapping mechanism of the present invention performs the operations as shown in FIG. 6. In step 601, a record containing n texture parameters of interest (p1,p2,p3 . . . pn) is associated with each vertex of one or more primitives of the scene. The texture mapping mechanism of the present invention preferably performs steps 603 and 605. In step 603, when performing the Z clipping operation, if a primitive crosses one of the Z-boundaries, the texture parameters corresponding to new vertices are determined by linear interpolation with respect to the texture parameters at the original vertices and the view coordinates of such original vertices. In step 605, when performing the XY clipping operation, if a primitive crosses either of the XY boundaries, the texture parameters corresponding to new vertices are determined by interpolation with respect to the texture parameters at the original coordinates and the view coordinates of the original vertices.

In step 607, when performing the setup operations for a given elementary area component, at each vertex of the given elementary area component, the texture mapping mechanism i) determines p1/zv,p2/zv,p3/zv . . . pn/zv and N/zv for the parameters associated with the vertex, wherein N is a power of 2; and ii) evaluates the plane equations to derive the partial derivatives $\partial(p1/zv)/\partial x$, $\partial(p1/zv)/\partial y$, $\partial(p2/zv)/\partial x$, $\partial(p2/zv)/\partial y$, . . . $\partial(pn/zv)/\partial x$, $\partial(pn/zv)/\partial y$, $\partial(N/zv)/\partial x$, and $\partial(N/zv)/\partial y$.

In step 609, the texture mapping mechanism performs the following at each pixel covered by the given elementary area component together with the shading calculations (or in place of the shading calculations, for example, when the texture parameters identify a record that represents the surface color of the primitive):

i) determines $(p1/zv)_{new}$, $(p2/zv)_{new}$, . . . $(pn/zv)_{new}$, $(N/zv)_{new}$ row according to values of $(p1/zv)_{old}$, $(p2/zv)_{old}$, . . . $(pn/zv)_{old}$, $(N/zv)_{old}$ at the previous pixel and the partial derivatives $\partial(p1/zv)/\partial x$, $\partial(p1/zv)/\partial y$, $\partial(p2/zv)/\partial x$, $\partial(p2/zv)/\partial y$, . . . $\partial(pn/zv)/\partial x$, $\partial(pn/zv)/\partial y$, $\partial(N/zv)/\partial x$, and $\partial(N/zv)/\partial y$; and ii) determines $M/(N/zv)_{new}$ at the pixel utilizing a look-up table wherein M is a power of 2;

iii) determines $$(p1)_{new} = (p1/zv)_{new} * (M/(N/zv)_{new}) * (N/M)$$

$$(p2)_{new} = (p2/zv)_{new} * (M/(N/zv)_{new}) * (N/M)$$

$$(pn)_{new} = (pn/zv)_{new} * (M/(N/zv)_{new}) * (N/M)$$

iv) associates $(p1)_{new}$, $(p2)_{new}$, . . . $(pn)_{new}$ with the pixel.

Finally, in step 611, the parameter values $(p1)_{new}$, $(p2)_{new}$, . . . $(pn)_{new}$ are used by the graphics system to process the pixel. For example, if the texture parameters identify a record that represents the surface color of the object, the parameters may be used to retrieve the contents of the record corresponding to the parameters. The contents are then written to the frame buffer 210 for display on the display device 112.

To provide a more detailed description of the texture mapping mechanism of the present invention, consider an example wherein two texture parameters (u,v) are associated with each vertex of at least one primitive of the scene to be rendered. The texture parameters (u,v) identify the coordinates of a record that represents a surface color. The records identified by the texture coordinates may be stored in the system memory 104, or in a separate texture memory (not shown). In step 601, a record containing the two texture parameters (u,v) is associated with each vertex of one or more primitives of the scene.

Figure 7:
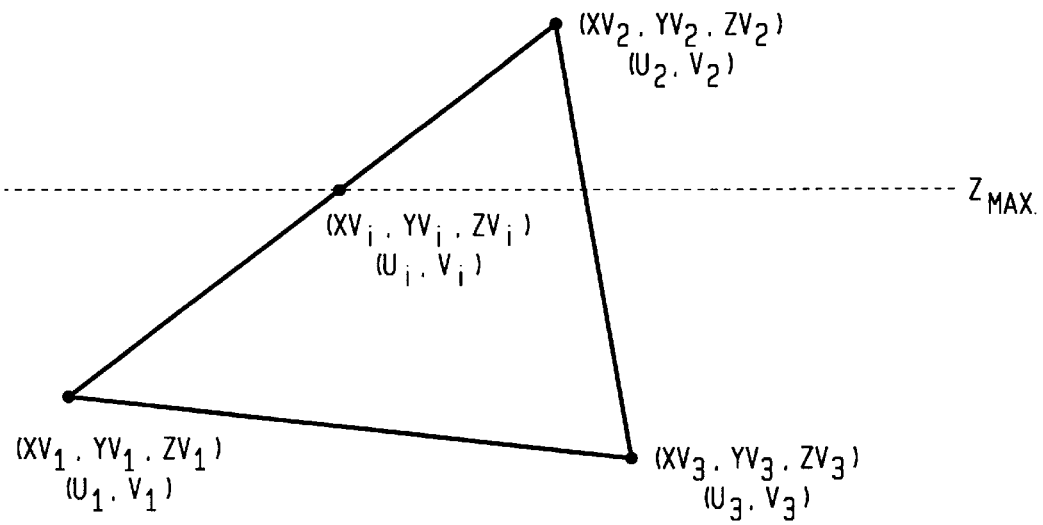
FIG. 7 is a pictorial representation of a primitive upon which is performed a Z clipping operation in accordance with the present invention.

In step 603, when performing the Z clipping operation (of step 309), if a primitive is clipped, the texture parameters (u,v) corresponding to the newly generated vertices are determined by linear interpolation with respect to the texture parameters (u,v) at the original vertices and the view coordinates of such original vertices. FIG. 7 illustrates the operation of the texture mapping mechanism in performing the Z clipping and interpolation of step 603. As shown, a primitive defined by three vertices having coordinates ($xv_1$, $yv_1$, $zv_1$), ($xv_2$, $yv_2$, $zv_2$), ($xv_3$, $yv_3$, $zv_3$) each associated with texture parameters ($u_1$, $v_1$), ($u_2$, $v_2$), ($u_3$, $v_3$), respectively is clipped against a Z clipping plane Z=Zmax. A new vertex defined by the coordinates ($xv_i$, $yv_i$, $zv_i$) and associated with the new texture parameters ($u_i$, $v_i$) is generated that corresponds to interpolated point where the primitive crosses the Z=Zmax boundary according to the following equations:

$$xv_i = \frac{xv_1(zv_2 - Zmax) + xv_2(Zmax - zv_1)}{(zv_2 - zv_1)}$$

$$yv_i = \frac{yv_1(zv_2 - Zmax) + yv_2(Zmax - zv_1)}{(zv_2 - zv_1)}$$

$$zv_i = Zmax$$

$$u_i = \frac{u_1(zv_2 - Zmax) + u_2(Zmax - zv_1)}{(zv_2 - zv_1)}$$

$$v_i = \frac{v_1(zv_2 - Zmax) + v_2(Zmax - zv_1)}{(zv_2 - zv_1)}$$

Similar operations may be performed to define the interpolated coordinates and texture parameters associated with a new vertex that lies between the two vertices having coordinates ($xv_2$, $yv_2$, $zv_2$) and ($xv_3$, $yv_3$, $zv_3$). In addition, similar operations may be performed to define the interpolated coordinates and texture parameters associated with the clipping performed against the plane Z=Zmin.

Figure 8:
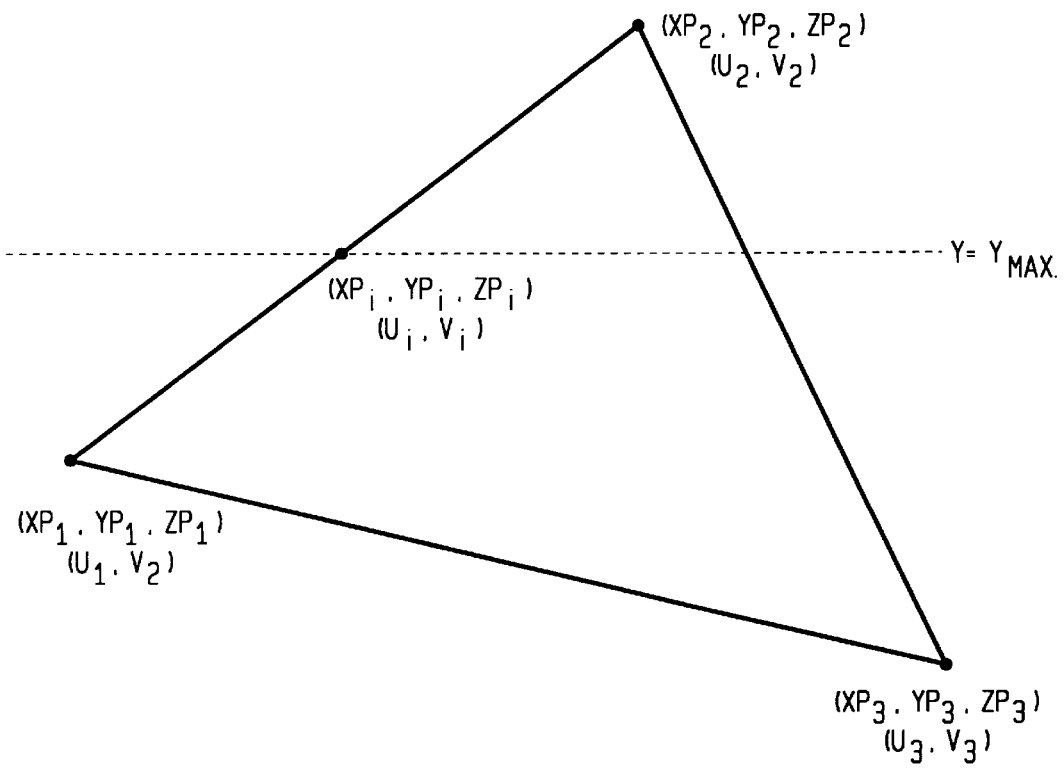
FIG. 8 is a pictorial representation of a primitive upon which is performed an XY clipping operation in accordance with the present invention.

In step 605, when performing the XY clipping operation (of step 313), if a primitive is clipped, the texture parameters (u,v) corresponding to the newly generated vertices are determined by linear interpolation with respect to the texture parameters (u,v) at the original vertices and the view coordinates of such original vertices. FIG. 8 illustrates the operation of the texture mapping mechanism in performing the XY clipping and interpolation of step 605. As shown, a primitive defined by three vertices having coordinates ($xp_1$, $yp_1$, $zp_1$), ($xp_2$, $yp_2$, $zp_2$), ($xp_3$, $yp_3$, $zp_3$) each associated with texture parameters ($u_1$, $v_1$), ($u_2$, $v_2$), ($u_3$, $v_3$), respectively is clipped against a Y clipping plane Y=Ymax. A new vertex defined by the coordinates ($xp_i$, $yp_i$, $zp_i$) and associated with the new texture parameters ($u_i$, $v_i$) is generated that corresponds to interpolated point where the primitive crosses the Y=Ymax boundary according to the following equations:

$$xp_i = \frac{xp_1(yp_2 - Ymax) + xp_2(Ymax - yp_1)}{(yp_2 - yp_1)}$$

$$yp_i = Ymax$$

$$zp_i = \frac{zp_1(yp_2 - Ymax) + zp_2(Ymax - yp_1)}{(yp_2 - yp_1)}$$

$$zv'_i = \frac{1}{zp_i}$$

$$xv'_i = xp_i * zv_i$$

$$yv'_i = yp_i * zv_i$$

$$u_i = \frac{u_1(yv_2 - yv'_i) + u_2(yv'_i - yv_1)}{(yv_2 - yv_1)}$$

$$v_i = \frac{v_1(yv_2 - yv'_i) + v_2(yv'_i - yv_1)}{(zv_2 - zv_1)}$$

Note that the interpolation of the texture coordinates is performed in view coordinate system, and not in the projected coordinate system. Similar operations may be performed to define the interpolated coordinates and texture parameters associated with a new vertex that lies between the two vertices having coordinates ($xp_2$, $yp_2$, $zp_2$) and ($xp_3$, $yp_3$, $zp_3$). In addition, similar operations may be performed to define the interpolated coordinates and texture parameters associated with the clipping performed against the plane Y=Ymin, X=Xmax, and X=Xmin.

In step 607, at each vertex of a given elementary area component, the texture mapping mechanism calculates u/zv, v/zv and N/zv for the texture parameters associated with the vertex, wherein N is a power of 2. The value of N is chosen according to the range of depth values of the primitives. For example, if the depth values are 16 bit quantities, N may be set to $2^{16}$. Preferably, the texture mapping mechanism of the present uses an exact division operation to determine N/zv and then uses the resultant output to determine u/zv and v/zv as follows:

$u/zv = u*(N/zv)*(1/N)$; and $v/zv = v*(N/zv)*(1/N)$.

The multiplication by (1/N) operation is preferably a right shift operation by the number of bits represented by N.

Figure 9:
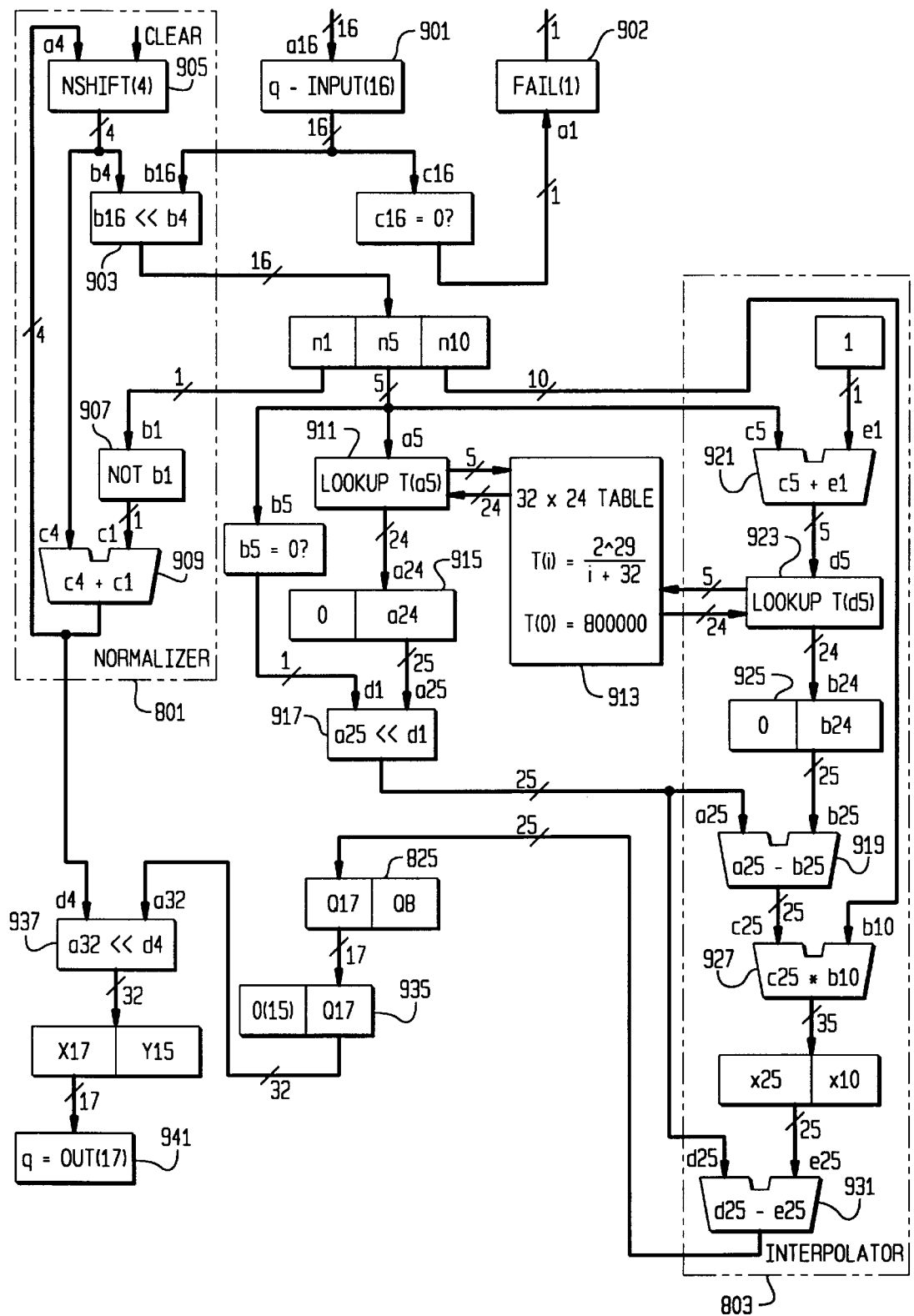
FIG. 9 is a functional block diagram of logic embodying the approximate calculation of M/q utilizing a single look-up table according to the present invention.

In addition, in step 607, the texture mapping mechanism evaluates the plane equations to derive the partial derivatives $\partial(u/zv)/\partial x$, $\partial(u/zv)/\partial y$, $\partial(v/zv)/\partial x$, $\partial(n/zv)/\partial y$, $\partial(N/zv)/\partial x$, and $\partial(N/zv)/\partial y$ pertaining to the elementary area component. Por example, consider a elementary area component defined by three vertices having coordinates ($xp_1$, $yp_1$), ($xp_2$, $yp_2$), ($xp_3$, $yp_3$) and associated with texture parameters ($u_1$, $v_1$), ($u_2$, $v_2$), ($u_3$, $v_3$), respectively, as shown in FIG. 9. The partial derivatives may be calculated according to the following equations:

$$dx_1 = xp_2 - xp_1 \qquad dx_2 = xp_3 - xp_1$$

$$dy_1 = yp_2 - yp_1 \qquad dy_2 = yp_2 - yp_1$$

$$dQ_1 = Q_2 - Q_1 \qquad dQ_2 = Q_3 - Q_1$$

$$\frac{\delta Q}{\delta x} = \frac{dQ_1 dy_2 - dQ_2 dy_1}{dx_1 dy_2 - dx_2 dy_1}$$

$$\frac{\delta Q}{\delta y} = \frac{dQ_2 dx_1 - dQ_1 dx_2}{dx_1 dy_2 - dx_2 dy_1}$$

wherein Q represents any one of u/zv, v/zv, and N/zv for the given vertex as determined above.

In step 609, at each pixel covered by the given elementary area component, the texture mapping mechanism of the present invention determines (u/zv),new, and (v/zv),new, and (N/zv)new at the given pixel according to the following equations:

$$Q_{new} = Q_{old} + \frac{\delta Q}{\delta x}\Delta x + \frac{\delta Q}{\delta y}\Delta y$$

wherein $Q_{old}$ represents any one of u/zv, v/zv, and N/zv at the previous pixel, wherein $\partial Q/\partial x$ and $\partial Q/\partial y$ represent the partial derivatives of the corresponding one of (u/zv), (v/zv), and (N/zv) for the given elementary area component, and ($\Delta x, \Delta y$) are the integer raster displacements from the previous pixel to the current pixel.

Typically, the rasterization is performed from one pixel to the next across scan lines, in which case ($\Delta x, \Delta y$)=(1,0), such that the equation presented above becomes:

$$Q_{new} = Q_{old} + \frac{\delta Q}{\delta x}$$

In addition, the texture mapping mechanism of the present invention utilizes a look up table to approximate the value of $M/(N/zv)_{new}$ at the pixel. To simplify the description, $(N/zv)_{new}$ is renamed to "q" below. M is a power of 2 determined by the range of values of q to be supported. For example, if q is given by a 16-bit integer with a value of 1 to $((2^{}16)-1)$, then M must be at least $2^{}16$ to ensure that $(M/q)>=1$. This approximation, which is less computationally intensive than an exact divide operation, significantly improves the performance of the system because a more efficient approximation is substituted for the exact division at each pixel.

More specifically, the texture mapping mechanism of the present invention includes a look-up table T that stores the values of $T[i]=K/(i+q_L)$ wherein q, is a power of 2 and i takes on the values of each integer from 0 to $(q_L-1)$. Thus, the look-up table T stores entries that represent the values $T[0]=K/q_L$, $T[1]=K/(q_L+1)$, ... $T=[q_L-1]=K/(2q_L-1)$. The number of entries (i.e., the value of $q_L$) and the number of bits in each entry determine the accuracy of the approximation to M/q, determined by the range of the values of q to be supported. A more detailed description in selecting the number of entries and the number of bits in each entry according to a desired accuracy is described below. Preferably, K is set to $q_L * 2^{n_T}$, wherein $n_T$ is determined as set forth below.

To approximate the value of M/q at the pixel using the look-up table, the texture mapping mechanism first determines which one of three cases evaluates as true, and then executes a routine specific to the case evaluated as true.

Case 1: $q \geq q_L$ and $q \leq (2q_L-1)$

If the value of q falls in the range $\{q \geq q_L$ and $q \leq (2q_L-1)\}$, then an entry in the table directly corresponding with K/q exists. In this case, the texture mapping mechanism generates the address of the corresponding entry in the look-up table and reads out the corresponding entry at that address. The value of M/q is determined from the data encoded in the entry read out from the table as follows:

$$M/q = K/q * M/K$$

Case 2: $q \geq 1$ and $q < q_L$

If the value of q falls in the range $\{q \geq 1$ and $q < q_L\}$, then the look-up table does not include an entry that directly corresponds to K/q. In this case, q is normalized to a value $q_{NORM}$ that directly corresponds to an entry in the table according to the following equations:

$$n\text{bits}_L = \log_2(q_L)$$

$$n\text{bits}_q = [1+\log_2(q)]$$

$$k\text{bits} = n\text{bits}_L + 1 - n\text{bits}_q$$

$$q_{NORM} = q * 2^{kbits}$$

Preferably, the multiplication of q by $2^{kbits}$ is performed by shifting the value of q left by kbits. The texture mapping mechanism then generates the address of the entry corresponding to $q_{NORM}$ in the look-up table and reads out the corresponding entry at that address. The data encoded in this entry is the value of $K/q_{NORM}$. The texture mapping mechanism then re-normalizes $K/q_{NORM}$ to generate M/q according to the following operation:

$$M/q = (K/q_{NORM}) * 2^{kbits} * M/K$$

Preferably, the multiplications of $(K/q_{NORM})$ by $2^{kbits}$ and M/K are performed by shifting the value of $(K/q_{NORM})$ left by kbits and $\log_2(M/K)$ bits, respectively.

Case 3: $q > (2q_L-1)$

If q falls in the range $\{q > (2q_L-1)\}$, then the look-up table does not include an entry that directly corresponds to K/q. In this case, q is normalized to a value $q_{NORM}$ that directly corresponds to an entry in the table according to the following equations:

$$n\text{bits}_L = \log_2(q_L)$$

$$n\text{bits}_q = [1+\log_2(q)]$$

$$k\text{bits} = n\text{bits}_q - n\text{bits}_L - 1$$

$$q_{NORM} = q / 2^{kbits}$$

Preferably, the division of q by $2^{kbits}$ is performed by shifting the value of q right by kbits. The texture mapping mechanism then generates the address of the entry corresponding to $q_{NORM}$ and the entry corresponding to $(q_{NORM}+1)$ in the look-up table and reads out the corresponding entries at the respective address. The data encoded in such entries is the value of $K/q_{NORM}$ and $K/(q_{NORM}+1)$. The texture mapping mechanism then generates M/q according to the following operation:

$$\delta = q - (q_{NORM} * 2^{kbits})$$

$$f_1 = K/q_{NORM}$$

$$f_2 = K/(q_{NORM}+1)$$

$$M/q = \frac{f_1 - \frac{\delta(f_1 - f_2)}{2^{kbits}}}{2^{kbits}} * \frac{M}{K}$$

$$M/q = \frac{(f_1 * 2^{kbits}) - \delta(f_1 - f_2)}{2^{2*kbits}} * \frac{M}{K}$$

Preferably, the multiplication of $f_1$ by $2^{kbits}$ is performed by shifting the value of $f_1$ left by kbits, and the division of the resultant numerator by $2^{2*kbits}$ is performed by shifting the resultant numerator right by 2*kbits.

As described above, a look up table is used to approximate the value of $M/(N/zv)_{new}$ at a given pixel. The relative accuracy of the approximation is controlled by the number of entries in the look-up table and the number of bits of each entry of the look-up table. To achieve a relative accuracy of one part in $2^A$ parts, it can be shown that the number of bits n, in each entry must conform to the following condition:

$$n_T > A + n\text{bits}_{qm} - n\text{bits}_L$$

wherein qm=maximum value of q $n\text{bits}_{qm} = [1+\log_2(qm)]$ $n\text{bits}_L = \log_2(q_L)$ The value of $n\text{bits}_L$ dictates the number of entries in the look up table. For example, if $n\text{bits}_L$ is 5, then the number of entries is 32; yet, if $n\text{bits}_L$ is 6, then the number of entries is 64. To ascertain the number of bits in each entry, consider the following example wherein A=12, $n\text{bits}_{qm}=16$, and $n\text{bits}_L=5$. In this case, nT must be greater than or equal to 24. Thus a single look-up table having 32 entries with 24 bits per entry, or a total of 768 bits may be used for a relative accuracy of one part in $2^{12}$ parts. If a higher level of accuracy is required, then a table having 64 entries can be used. In another example, consider the case wherein A=16, $nbits_{qn}$=16, and $nbits_L$=6. In this case, $n_T$ must be greater than or equal to 25. Thus a single look-up table having 64 entries with 25 bits per entry, or a total of 1600 bits may be used for a relative accuracy of one part in $2^{14}$ parts.

Having approximated $(M/(N/zv))_{new}$ for the given pixel as described above, the texture mapping mechanism of the present invention in step 609 determines the (u,v) coordinates corresponding to the pixel according to the following operation:

$$u=(u/zv)_{new}*(M/(N/zv)_{new})*(N/M)$$
$$v=(v/zv)_{new}*(M/(N/zv)_{new})*(N/M)$$

The multiplication by (N/M) operation is preferably accomplished by selecting the appropriate high order bits of the output of the $(u/zv)_{new}*(M/(N/zv)_{new}$ and the $(N/zv)_{new}$, or M/q, at each pixel is shown in FIG. 9. For the sake of description, q is assumed to be a 16 bit integer and K is fixed at $2^{16}$. The 16-bit value of q is received at a q-input register 901. $(v/zv)_{new}*(M/(N/zv)_{new}$ multiplication operations, respectively, which is equivalent to a right shift operation by the number of bits represented by N less the number of bits represented by M. The texture mapping mechanism then associates the newly generated (u,v) coordinates with the given pixel.

Finally, in step 611, the (u,v) coordinates associated with a given pixel are used by the graphics system to process the pixel. In this example where the (u,v) coordinates identify a record that represents the surface color of the object, the (u,v) coordinates are used to retrieve the contents of the record corresponding to the (u,v) coordinates. The contents of the retrieved record are then written to the frame buffer 210 for display on the display device 112.

An example of the circuitry that approximates the value of $M/(N/zv)_{new}$ or M/q, at each pixel is shown in FIG. 9. For the sake of description, q is assumed to be a 16 bit integer and M is fixed at $2^{16}$. the value of q is first stored in an input register 901. When the value of q is stored in the register qinput 901, the contents of the 4-bit register N-shift 905 and a 1-bit fail register 902 must be cleared to zeroes.

The value in the qinput register 901 is checked and if the contents of qinput 901 are found to be zero, the bit in the fail register 902 is set to one and the operation of the remainder of the logic is halted. If the Fail bit 902 is a 1, then the contents of the output register q-out 941 are undefined.

The value stored in the qinput register 901 is then subjected to a normalizing function which is performed by part 801 in FIG. 9. This begins by supplying the contents of the qinput register 901 to port b16 of a 16-bit wide shift register 903. The value stored in Nshift 905 is supplied to port b4. The output of this shift register 903 consists of the value supplied at port b16 shifted left by the number of bits specified by the value supplied to port b4. This output value is padded on the right by zeroes. The result is then divided into three components, n1, n5 and n10: the n1 component consists of the most-significant bit, the n5 component consists of the next 5 bits, and the n10 component consists of the remaining 10 bits. If the value of n1 is zero, then the contents of the Nshift register 905 is incremented by one and the contents of the shift register 903 are shifted left by one more bit. This is repeated until n1=1, a condition guaranteed by the previous test that excludes the case of qinput=0. When this function is completed, the values at a4, b4, and c4 are all equal to the contents of Nshift register 905.

The normalizer 801 shown in FIG. 9 illustrates one possible means of accomplishing the normalization function. This invention is not limited to this specific implementation of the normalization function and may use any alternative mechanism that accomplishes the same result. That is, the value found in the qinput register 901 is shifted to the left until a 1 appears in the left-most bit (n1) of 16 bit value contained in the shift register 903, and the number of bits of shifting needed to achieve this result are available as a second output signal (in this case supplied to port d4 of shift register 937).

After the normalization function has been completed, the operation of the logic of FIG. 9 may be considered in terms of the following three cases based on the values of q and $q_L$:

Case 1: $q_L<=q<=(2*q_L-1)$

If the value of q falls in the range of $q_L$ through $2*q_L-1$, then value contained in the Nshift register 905 will equal 10 and the union of n1 and n5 will equal q. The value of n5 alone is equal to $q-q_L$ (q-32 in this example). This value is used to look up entry T[n5] in a look-up table T designated 913. As shown in the table T below, the look-up table 913 preferably contains the values of $(2^{29}/(i+32)$, except for the first entry which is set to 8000 000 (hex).

TABLE T

| i (hex) | T(i) (hex) |
| --- | --- |
| 0 | 8 000 000 |
| 1 | 0 F83 E0F |
| 2 | 0 F0F 0F0 |
| 3 | 0 EA0 EA0 |
| 4 | 0 E38 E38 |
| 5 | 0 DD6 7C8 |
| 6 | 0 D79 435 |
| 7 | 0 D20 D20 |
| 8 | 0 CCC CCC |
| 9 | 0 C7C E0C |
| A | 0 C30 C30 |
| B | 0 BE8 2FA |
| C | 0 BA2 E8B |
| D | 0 B60 B60 |
| E | 0 B21 642 |
| F | 0 AE4 C41 |
| 10 | 0 AAA AAA |
| 11 | 0 A72 F05 |
| 12 | 0 A3D 70A |
| 13 | 0 A0A 0A0 |
| 14 | 0 9D8 9DB |
| 15 | 0 9A9 0E7 |
| 16 | 0 97B 425 |
| 17 | 0 94F 209 |
| 18 | 0 924 924 |
| 19 | 0 8F6 823 |
| 1A | 0 8D3 DCB |
| 1B | 0 8AD 8F2 |
| 1C | 0 888 888 |
| 1D | 0 864 B84 |
| 1E | 0 842 108 |
| 1F | 0 820 820 |

The look-up is accomplished by supplying the value of N5 to port a5 of table look-up logic 911, which retrieves the corresponding entry T[a5] from the look-up table 913. The resulting value T[a5] is $K/(n5+32)=K/((q-q_L)+q_L)=K/q$. Therefore, the table 913 contains precisely the value of K/q accurate to 24 bits for any integer value of q in this range.

The 24-bit value of K/q is then forwarded to pad logic 915 that pads the value on the left with a zero to form a 25-bit value (a25). The result is supplied in input a25 of shift register 91. If the value of n5 is zero, then the value of a25 is shifted left by one bit to yield a 25-bit value comprised of a single (1) bit followed by 24 zeroes. This allows the initial entry $T[0]=2^{24}$ to be represented with only 24 bits. Numerous alternative methods of accomplishing the same result will be apparent to one skilled in the art.

The values of n5 and n10 are also supplied to an interpolator 803. In this case, the value of n10 will always be zero. Supplying this value of n10 to port b10 of the multiplier 927 in the interpolator 803 ensures that the value of x25 supplied to port e25 of subtraction unit 931 is always zero. Consequently, the output of the interpolator 803 is equal to the value a25 determined by the table look-up and shift operations described above.

After passing through the interpolator 803 unchanged, the right-most 8 bits of q25 are discarded. 15 bits of zeroes are appended to the left side of the remaining 17 bits (Q17) by append logic 935 and the resulting 32-bit signal is supplied to port a32 of a 32-bit shift register 937. The contents of this register 937 are then shifted left by 10 bits (the value contained in the Nshift register 905). The right-most 15 bits of this result (Y15) are discarded and the remaining 17 bits (X17) are supplied to the 17-bit output register qout 941.

The resulting value contained in the qout register 941 (in this example) is equal to $(2^{16})/q$. Except for q=32, the leftmost 6 bits contained in the qout register 941 will be zero, leaving 11 significant bits to qout. (For q=32, there are 5 bits of zeroes and 12 significant bits to qout.) Additional precision is possible by making qout wider and discarding fewer bits at Y15 and Q8.

Case 2: $1<=q<=q_L-1$

If q is in the range of 1 through $q_L-1$, then the normalizer 801 will yield a value of Nshift in the range of 11 (for q=16 to 31) to 15 (for q=1). The union of n1 and n5 will be equal to q multiplied by $2^{Nshift\ 10}$. As in case 1, the value of n10 is zero and the interpolator 801 has no effect.

Unlike CASE 1 where the table entries of table 913 corresponded directly to each value of q, there are no table entries for the values of q in this range. Instead, the effect of the normalizer 801 generates a normalized value $q_{NORM}$ equal to q multiplied by $2^{kbits}$. The value of $q_{NORM}$ corresponds to the union of n1 and n5, and kbits is equal to (Nshift-10). (Nshift happens to be $15-\log_2(q)$, so $kbits=5-\log_2(q)=\log_2(q_L)-\log_2(q)=nbits_L+1-nbits_q$, where $nbits_L=\log_2(q_L)$ and $nbits_L=1+\log_2(q)$.)

In this case, since the union of n1 and n5 is $q_{NORM}$, the value of n5 is $(q_{NORM}-32)$ and the result of the table look-up is $T[q_{NORM}-32]=K/q_{NORM}=(K/2^{kbits})/q$. The value of Q17 is given by $(K/q_{NORM})/2^8$ and the value at X17 is given by:

$$X17=Q17*2^{Nshift}/2^{15}$$

$$=((K/q_{NORM})/2^8)*2^{(kbits+10)}/2^{15}$$

$$=((K/2^{kbits})/q)*2^{kbits}/2^{13}$$

$$=M/q$$

for the values of $K=2^{29}$ and $M=2^{16}$ used in this example.

The resulting values contained in the qout register 941 equal M/q and will have 1 to 5 leading zeros followed by 12 to 16 significant bits, except for q=1 where the result will be a one followed by sixteen zeroes. Greater precision may be achieved by reducing the number of bits in Q8 and Y15, and making Q17, a32, X17, and qout wider.

Case 3: $q>2*q_L-1$

If q is greater than $2*q_L-1$, then the value contained in the Nshift register 905, which is determined by the normalizer 801, will be less than 10. As in CASE 2, the union of n1 and n5 represents a normalized value of q. Unlike CASE 2, where $q_{NORM}$ was greater than q by a factor of 2 the value of $q_{NORM}$ is less than q. This value is given by:

$$q_{NORM}=q/2^{kbits}$$

where $kbits=nbits_q-nbits_L-1$.

This is equivalent to the value of kbits defined in case 2, except that the sign has been reversed to produce a positive value for kbits. The other terms are equivalent to the forms defined for CASE 2.

As in the previous cases, the value of n5 equals $(q_{NORM}-32)$ and the table look-up operation yields $T[n5]=K/q_{NORM}$. Unlike the previous cases, however, the value of n10 is not necessarily zero. In this case, the left-most kbits bits of n10 are determined by the low order kbits bits of q. If these bits are all zero, then q is $2^{kbits}$ times $q_{NORM}$, and K/q may be determined directly as $(K/q)=(K/q_{NORM})/2^{kbits}$. In this case, n10 is zero and the interpolator 803 has no effect.

If n10 is not zero, then a value of K/q may be approximated through linear interpolation between two successive entries in the table 913. The first of these entries is determined as for cases 1 and 2. In order to obtain the second entry, the value of n5 is applied to the port c5 of a 5-bit adder 921. A constant 1 is applied to the second port e1 of this adder. The 5-bit result is applied to port d5 of the table look-up logic 923, which retrieves the corresponding entry T[d5] from the look-up table 913. The value at d5 will be equal to n5+1, except when n5=31 where d5=(n5+1) mod 32=0. This is handled by storing the value appropriate for d5=32 as T[0]. The resulting value of T[d5] is equal to $K/(q_{NORM}+1)$. In logic 925, a 25-bit value is formed by appending a zero to the left side of the result of b24=T[d5]. The resulting value of $b25=f2=K/(q_{NORM}+1)$ is then supplied to subtraction unit 919 where b25 is subtracted from $a25=f1=K/q_{NORM}$ to form the slope of the interpolation.

The difference (f1-f2) is applied to port c25 of multiplier 927 and the value of n10 is applied to port b10 of the multiplier 927. The value of n10 may be represented as $$n10=(q-(q_{NORM}*2^{kbits}))*2^{Nshift}$$

$$=\delta*2^{10\cdot kbits}$$

$$=\delta*2^{10}/2^{kbits}$$

The 35-bit product of c25 with b10=n10 are split into the high order 25 bits (x25) and low order 10 bits (x10). The low order 10 bits (x10) are discarded. The remaining 25 bits (x25) are determined by:

$$x25=c25*b10/2^{10}$$

$$=(f1-f2)*\delta/2^{kbits}$$

The value of f1=a25 is copied to port d25 of subtractor 931 and the value of x25 is applied to port e25 of subtractor 931. The result is:

$$q25=d25-e25=f1-(f1-f2)*\delta/2^{kbits}$$

Subsequent operations produce:

$$a32=Q17=q25/2^8,$$

and $$M/q=X17=a32*2^{Nshift}/2^{15}$$

$$=q25*2^{10\cdot kbits}/2^{23}$$

$$=(q25/2^{kbits})/2^{13}$$

$$\frac{M}{q} = \frac{f1-(f1-f2)\times\delta/2^{kbits}}{2^{kbits}\times 2^{13}}$$

As shown in FIG. 9, only one multiplier is needed for the product of c25=(f1-f2) with b10=n10. All other multiplications and divisions are accomplished by shifting or by extracting appropriate bits from other values.

Figure 10:
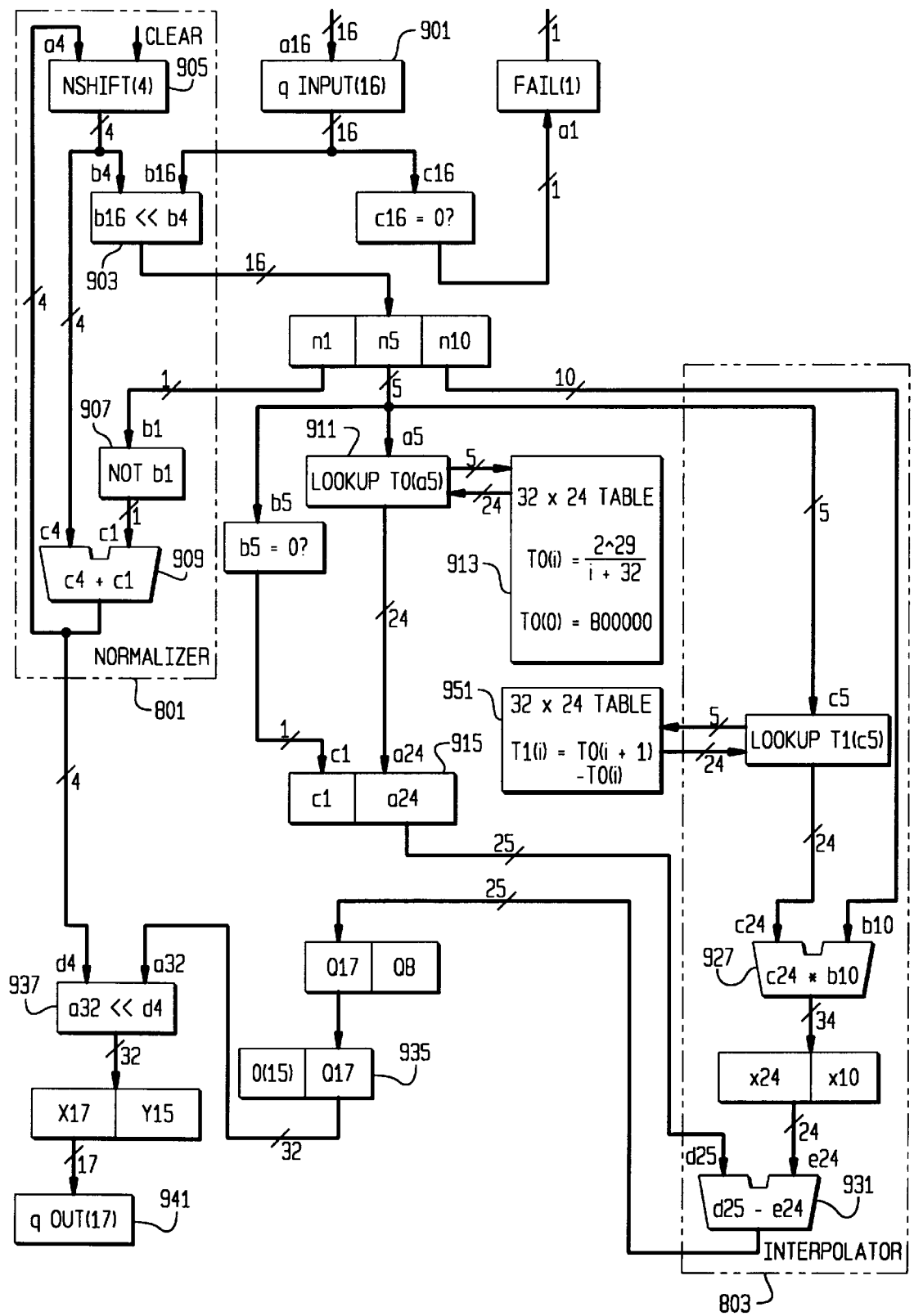
FIG. 10 is a functional block diagram of alternate logic embodying the approximate calculation of M/q utilizing two look-up tables according to the present invention.

The interpolation logic of FIG. 9 makes use of the same table required for cases 1 and 2. As an alternative, as shown in FIG. 10, it is possible to simplify the interpolator 803 by using two tables instead of a single table. In this case, Table T0 is the same as the original table 913 of FIG. 9, except that the first entry is set to 000000 instead of 800000. The entries in the second table T1, designated 951, are determined by the differences between successive entries in table T (or T0). That is T1[i]=T0[i+1]−T0[i], where T0[32] is defined as 2*T[0]. This allows the subtraction unit 919 to be removed, as well as the adder 921 for c5+e1. In addition, the (a25, d1) shift operation performed by shift register 917 can be replaced by appending bit c1 to the left side of a24. The other features of FIG. 10 are identical to the corresponding parts of FIG. 9 as described above.

In summary, the texture mapping mechanism of the present invention provides for efficient perspective correction of the texture function. The efficiency results from the use of a relatively small lookup table to approximate K/q at each pixel. Because the texture mapping mechanisim may be implemented by a small lookup table and modest circuitry, the texture mapping mechanism of the present invention is suitable for use in lower cost systems.

Other embodiments of the invention will be apparent to those skilled in the art from consideration of the specification and practice of the invention disclosed herein.

It is intended that the specification and examples be considered as examples only, with the true scope of the invention being indicated by the claims.

We claim:

1. In a computer graphics system wherein objects are represented by one or more primitives each defined by a plurality of vertices, and wherein said objects are rendered to generate a two dimensional image for display during which coordinates of each vertex of said primitives are subjected to a perspective transformation which yields a perspectively transformed depth coordinate associated with the vertex, a method for mapping a texture function to pixels covered by at least one of said primitives comprising the steps of:

associating at least one texture parameter to each vertex of said at least one of said primitives;

for each vertex of said at least one of said primitives, determining a perspective factor associated with the given vertex based upon the perspectively transformed depth coordinate associated with the given vertex, applying said perspective factor associated with the given vertex to each texture parameter associated with the given vertex to generate a perspectively transformed texture parameter associated with the given vertex;

for each pixel covered by said at least one primitive, for each texture parameter associated with each vertex of said at least one primitive, determining a perspectively transformed texture parameter associated with the given pixel according to perspectively transformed texture parameters associated with each vertex of said at least one of said primitives, determining a perspective factor associated with the given pixel according to said perspective factor associated with each vertex of said at least one of said primitives, generating an approximation of M over said perspective factor associated with the given pixel according to data stored in a look up table, and for each perspectively transformed texture parameter associated with the given pixel, performing an operation on said perspectively transformed texture parameter, said perspective factor and said approximation associated with the given pixel to determine a perspectively correct value of said texture parameter associated with the given pixel.

2. The method of claim 1, wherein the step of applying said perspective factor to each texture parameter associated with the given vertex includes the step of dividing each texture parameter by the projected z coordinate of the given vertex.

3. The method of claim 1, wherein each perspectively transformed texture parameter associated with the given pixel is determined according to plane equations associated with said at least one of said primitives, and wherein said perspective factor associated with the given pixel is determined according to plane equations associated with said at least one of said primitives.

4. The method of claim 1, wherein said look up table stores a value of K/q for a range of q.

5. The method of claim 4, wherein if said perspective factor associated with a given pixel lies within said-range of q, then reading out from said look up table a value of K/q coinciding with said perspective factor, and determining said approximation of M over said perspective factor associated with the given pixel according to said value of K/q read out from said look up table.

6. The method of claim 4, wherein if said perspective factor associated with the given pixel does not lie within said range of q, then applying a normalization function to said perspective factor associated with the given pixel to generate a normalized q that is within said range of q, reading out from said look up table a value coinciding with K over said normalized q, applying a denormalization function to said value read out from said look up table to generate said approximation of M over said perspective factor associated with the given pixel.

7. The method of claim 6, wherein said range of q is defined by the interval ($q_{min}$, $q_{max}$) and wherein, if said perspective factor assocaited with the given pixel is less than $q_{min}$, then said normalized function that generates said normalized q ($q_{NORM}$) is defined by the following equations:

$q$=perspective factor associated with the given pixel $n\text{bits}_L = \log_2(q_{min})$ $n\text{bits}_q = [1 + -\log_2(q)]$ $k\text{bits} = n\text{bits}_L + 1 - n\text{bits}_q$ $q_{NORM} = q * 2^{kbits}$ and said denormalization function is defined by the following equation:

$M/q = (K/q_{NORM}) * 2^{kbits} * M/K.$

8. The method of claim 6, wherein said range of q is defined by the interval ($q_{min}$, $q_{max}$), further comprising the step of:

if said perspective factor associated with the given pixel is greater than $q_{max}$, then reading out from said look up table a value coinciding with K over said normalized q incremented by 1.

9. The method of claim 6, wherein, if said perspective factor associated with the given pixel is greater than $q_{max}$, then said normalized function that generates said normalized q ($q_{NORM}$) is defined by the following equations:

q=perspective factor associated with the given pixel $n\text{bits}_L = \log_2(q_{min})$ $n\text{bits}_q = [1+\log_2(q)]$ $k\text{bits} = n\text{bits}_q - n\text{bits}_L - 1$ $q_{NORM} = q*2^{kbits}$ and said denormalization function is defined by the following equations:

$\delta = (q - q_{NORM})*2^{kbits}$ $f_1 = K/q_{NORM}$ $f_2 = K/(q_{NORM}+1)$ $$M/q = \frac{(f_1 * 2^{kbits}) - \delta(f_1 - f_2)}{2^{2*kbits}} \times \frac{M}{K}$$

10. The method of claim 4, wherein said look up table comprises 32 entries each storing a value of K/q, and wherein each entry comprises 24 bits.

11. The method of claim 4, wherein said look up table comprises 64 entries each storing a value of K/q, and wherein each entry comprises 25 bits.

12. In a computer graphics system wherein objects are represented by one or more primitives each defined by a plurality of vertices, and wherein said objects are rendered to generate a two dimensional image for display during which coordinates of vertices of said primitives are subjected to a perspective transformation which yields a perspectively transformed depth coordinate associated with the vertex, an apparatus for mapping a texture function to pixels covered by at least one of said primitives comprising:

means for associating at least one texture parameter to each vertex of said at least one of said primitives;

for each vertex of said at least one of said primitives, means for determining a perspective factor associated with the given vertex based upon the perspectively transformed depth coordinate associated with the given vertex, means for applying said perspective factor associated with the given vertex to each texture parameter associated with the given vertex to generate a perspectively transformed texture parameter associated with the given vertex;

for each pixel covered by said at least one primitive, for each texture parameter associated with each vertex of said at least one primitive, means for determining a perspectively transformed texture parameter associated with the given pixel according to perspectively transformed texture parameters associated with each vertex of said at least one of said primitives, means for determining a perspective factor associated with the given pixel according to said perspective factor associated with each vertex of said at least one of said primitives, means for generating an approximation of M over said perspective factor associated with the given pixel according to data stored in a look up table, and for each perspectively transformed texture parameter associated with the given pixel, means for performing an operation on said perspectively transformed texture parameter, said perspective factor and said approximation associated with the given pixel to determine a perspectively correct value of said texture parameter associated with the given pixel.

13. The apparatus of claim 12, wherein said means for applying said perspective factor to each texture parameter associated with the given vertex comprises means for dividing each texture parameter by the projected z coordinate of the given vertex.

14. The apparatus of claim 12, wherein each perspectively transformed texture parameter associated with the given pixel is determined according to plane equations associated with said at least one of said primitives, and wherein said perspective factor associated with the given pixel is determined according to plane equations associated with said at least one of said primitives.

15. The apparatus of claim 12, wherein said look up table stores a value of K/q for a range of q.

16. The apparatus of claim 15, further comprising:

means for reading out from said look up table a value of K/q coinciding with said perspective factor associated with the given pixel if said perspective factor associated with the given pixel lies within said range of q, and means for determining said approximation of K over said perspective factor associated with the given pixel according to said value of K/q read out from said look up table.

17. The apparatus of claim 15, further comprising:

means for applying a normalization function to said perspective factor associated with the given pixel to generate a normalized q that is within said range of q if said perspective factor associated with the given pixel does not lie within said range of q, means for reading out from said look up table a value coinciding with K over said normalized q, and means for applying a denormalization function to said value read out from said look up table to generate said approximation of K over said perspective factor associated with the given pixel.

18. The apparatus of claim 17, wherein said range of q is defined by the interval ($q_{min}$, $q_{max}$), and wherein, if said perspective factor associated with the given pixel is less than $q_{min}$, then said normalized function that generates said normalized q ($q_{NORM}$) is defined by the following equations:

q=perspective factor associated with the given pixel $n\text{bits}_L = \log_2(q_{min})$ $n\text{bits}_q = [1+\log_2(q)]$ $k\text{bits} = n\text{bits}_L + 1 - n\text{bits}_q$ $q_{NORM} = q*2^{kbits}$ and said denormalization function is defined by the following equation:

$M/q = (K/q_{NORM})*2^{kbits}*M/K$

19. The apparatus of claim 17, wherein said range of q is defined by the interval ($q_{min}$, $q_{max}$), further comprising:

means for reading out from said look up table a value coinciding with K over said normalized q incremented by 1 if said perspective factor associated with said given pixel is greater than $q_{max}$.

20. The apparatus of claim 19, wherein, if said perspective factor associated with the given pixel is greater than $q_{max}$, then said normalized function that generates said normalized q ($q_{NORM}$) is defined by the following equations:

q=perspective factor associated with the given pixel $n\text{bits}_L = \log_2(q_{min})$ $n\text{bits}_q = [1+\log_2(q)]$ $k\text{bits} = n\text{bits}_q - n\text{bits}_L - 1$ $q_{NORM} = q*2^{kbits}$ and said denormalization function is defined by the following equations:

$\delta = (q - q_{NORM})*2^{kbits}$ $f_1 = K/q_{NORM}$ $f_2 = K/(q_{NORM}+1)$ $$M/q = \frac{(f_1 * 2^{kbits}) - \delta(f_1 - f_2)}{2^{2*kbits}} \times \frac{M}{K}.$$

21. The apparatus of claim 15, wherein said look up table comprises 32 entries each storing a value of K/q, and wherein each entry comprises 24 bits.

22. The apparatus of claim 15, wherein said look up table comprises 64 entries each storing a value of K/q, and wherein each entry comprises 25 bits.

23. The method of claim 4, wherein K is a power of 2.

24. The method of claim 1, wherein M is a power of 2.

25. The apparatus of claim 15, wherein K is a power of 2.

26. The apparatus of claim 12, wherein M is a power of 2.

* * * * *